S. SIS.
MILKING MACHINE.
APPLICATION FILED APR. 16, 1917.

1,255,239.

Patented Feb. 5, 1918.

Witness

Inventor
Sebastian Sis,
By C. A. Snow & Co.
Attorney

UNITED STATES PATENT OFFICE.

SEBASTIAN SIS, OF ST. PAUL, MINNESOTA, ASSIGNOR OF ONE-HALF TO EBERHARD HOEHL, OF ST. CLOUD, MINNESOTA.

MILKING-MACHINE.

1,255,239.   Specification of Letters Patent.   Patented Feb. 5, 1918.

Application filed April 16, 1917. Serial No. 162,366.

*To all whom it may concern:*

Be it known that I, SEBASTIAN SIS, a citizen of the United States, residing at St. Paul, in the county of Ramsey and State of Minnesota, have invented a new and useful Milking-Machine, of which the following is a specification.

This invention aims to provide a simple means whereby milk may be mechanically drawn from a cow or other animal directly into a storing or shipping receptacle.

Another object is to provide simple and efficient means for setting up the pulsating action necessary to draw the milk from the teats.

A further object is to construct the milking machine of few and simple parts in order that it may be readily operated and thoroughly and easily cleansed by one not especially skilled in the use of machinery.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing the preferred form of the invention has been shown.

In said drawing:—

Figure 1:
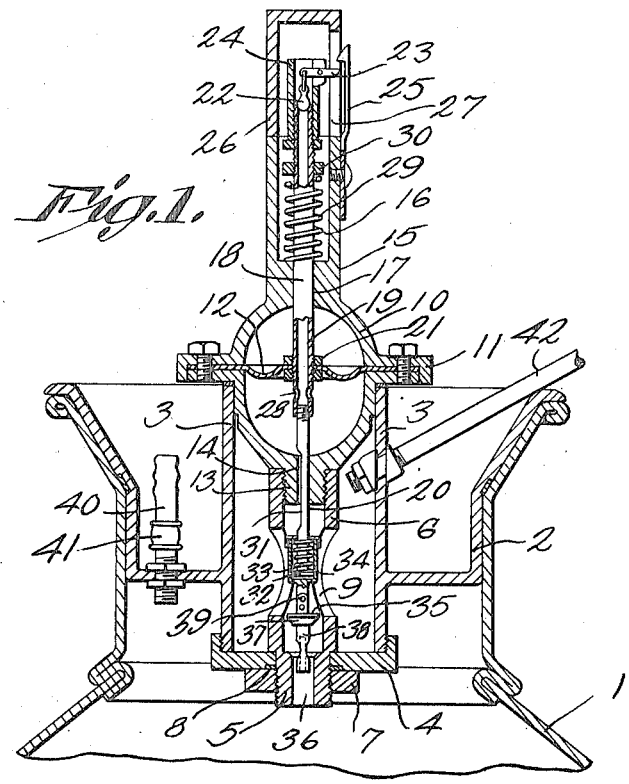
Figure 1 is a sectional side elevation of the invention showing its parts in detail.
Figure 2:
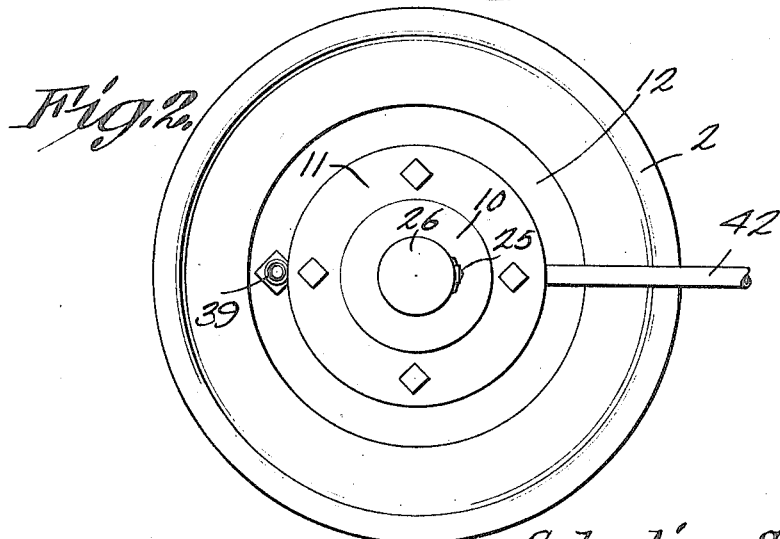
Fig. 2 is a top plan view of the invention.

In the drawings, 1 designates an ordinary milk can in which the body 2 of the apparatus is adapted to fit snugly. This body is provided with a concentric integral tube 3 having a head 4 and forming a milk receiving receptacle. An opening in the head 4 receives the restricted end 5 of a sleeve 6 held in position by a nut 7 and cut away intermediate its ends at 9 for communication with the receiving chamber 3. A diaphragm housing 10 consists of upper and lower substantially semi-spherical sections having interfitting flanges 11 between which is secured the diaphragm 12. An extension 13 having a bore 14 is formed on the lower of the two sections for engagement with the sleeve 6 to hold the diaphragm housing rigidly thereupon. The upper of the two sections of the diaphragm housing 10 has an integral cylindrical extension 15 provided with a recess 16 communicating with a bore 17 for the reception of a movable member 18 extending through the diaphragm housing 10 and bores 14 and 17.

The movable member 18 consists of a tubular section 19 and a solid section 20 and is secured to the diaphragm 12 by means of jam nuts 21. A valve 22 for closing the tubular section 19 is connected with a pivot arm 23 mounted on the valve housing 24 carried by the section 19. A trip 25 carried by the cap 26 and extending within the longitudinal slot 27 therein is adapted to engage the pivot arm 23 to unseat the valve 22 and allow flow of air into the lower section of the diaphragm housing 10 through the tubular section 19 and openings 28 formed therein and communicating with the housing beneath the diaphragm 12. A compression coil spring 29 embraces the tubular section 19 and is held seated upon the end wall of the recess 16 by means of a nut 30 on section 19. The solid section 20 has a bypass 31 to establish communication between the lower portion of the diaphragm housing 10 and the receiving chamber 3 and is provided with an upset end 32 for engagement with the coil spring 33 which is seated within the spring housing 34. A valve 35 for closing the bore 36 in the restricted end 5 has a head 37 provided with an apertured tubular shank 38 and a stem 39 for engaging the spring housing 34. An air outlet tube 40 in the body 2 is provided with a check valve 41 and is to be connected with a pump whereby air can be exhausted from the can after the body 2 has been placed in position. A milk inlet tube 42 projecting from the receiving chamber 3 is connected with the usual teat cups (not shown).

Attention is called to the fact that by removing the nut 7, free access may be gained to the milk receiving chamber in order to thoroughly and easily clean the same.

In operation, the body 2 is placed in position and air is withdrawn from the milk can 1 through the air outlet 40 creating a partial vacuum therein which is communicated to the milk receiving chamber 3, and to the lower portion of the diaphragm housing 10 through the apertured tubular shank 38 of the valve 35 and the by-pass 31 of the movable member respectively. Simultaneously with the downward movement of the diaphragm 12, resulting from partial vacuum thereunder, and the consequential seating of the valve 35, milk is drawn through the tube 42 to the milk receiving chamber 3. The inflowing milk partially relieves the vacuum and permits sufficient movement of the diaphragm 12 under the action of spring 29 to elevate the movable member 18 without unseating the valve 35 which is held seated by the lighter spring 34 and the unrelieved vacuum in the milk can 1. The pivot arm 23 is brought into engagement with the trip 25 by the elevation of the movable member 18 and the air valve is unseated, allowing air momentarily to enter the lower portion of the diaphragm housing 10 and flow from thence into receiving chamber 3 through the hollow portion 19 and the bypass 31 of the solid section 20 of the movable member 17 respectively. In the absence of a partial vacuum in the diaphragm housing 10 and receiving chamber 3, the upper spring 29 quickly unseats the valve 35 by overcoming the resistance of the lower spring 33 and the partial vacuum in the milk can 1, permitting the milk to flow into the can. The partial vacuum in the can will, at the same time, be extended into the chamber 3 and the diaphragm 12 be drawn down so that the valve 35 will again be seated. Arm 23 will snap past catch 25 and valve 22 will seat by gravity. The operation hereinbefore described will then be repeated, and as the operations occur in rapid succession, the desired pulsating action will take place. The initial exhaustion of air from the can 1 should be sufficient to effect the desired filling of the can with milk. After the can has been filled the body 2 can be placed in the mouth of another can, the air exhausted from the can, and the foregoing operation repeated.

Having thus described the invention, what is claimed as new is:

1. In a milking machine a casing, a diaphragm in the casing, a receptacle secured to the casing, there being a communication between the receptacle and the casing, a pipe for conducting the milk from a source of supply to the receptacle, a vacuum connection for the receptacle, and means cooperating with the diaphragm for intermittently and successively closing the vacuum connection; breaking the vacuum; and opening the vacuum connection.

2. In a milking machine, a milk can, a closure for the can, a milk receiving receptacle carried by the closure, there being a vacuum in said can and receptacle, a pipe to convey milk from a source of supply to the receptacle, means controlled by the milk to partially break the vacuum, and an automatically actuated valve to admit air to the receptacle to discharge the milk to the can and restore the vacuum.

3. In a milking machine, a diaphragm, a casing for the diaphragm, a milk receptacle secured to the casing, means to reduce the pressure on one side of the diaphragm to cause suction, means for conveying milk from a source of supply to the receptacle under the action of the suction, and means coöperating with the diaphragm to break the suction; discharge the milk from the receptacle; and restore the suction.

4. In a milking machine, a diaphragm, a casing for the diaphragm, a milk receiving receptacle secured to the casing, there being a discharge port for the receptacle, a valve adapted to the port and controlled by the diaphragm, means for conducting milk from a source of supply to the receptacle, a vacuum connection for actuating the diaphragm to seat the valve and close the port, such connection producing a suction and drawing milk from a source of supply to the receptacle, and means, including the valve, cooperating with the diaphragm for stopping the suction, discharging the milk from the receptacle, and restoring the suction.

5. In a milking machine, a diaphragm, a casing for the diaphragm, a milk receiving receptacle secured to the casing, provided with a discharge port and having its interior in communication with the interior of the casing at one side of the diaphragm, a pipe to conduct milk to the receptacle, a valve adapted to the discharge port and controlled by the diaphragm, an automatic air inlet valve controlled by the diaphragm, means for producing a partial vacuum in the receptacle and communicating lower half of the casing to deflect the diaphragm, close the discharge port, and draw milk into the receptacle, whereby the vacuum is partially broken, and the diaphragm retracted to operate the air inlet valve, discharge the milk from the receptacle, and restore the vacuum.

In testimony that I claim the foregoing as my own, I have hereto affixed my signature in the presence of two witnesses.

SEBASTIAN SIS.

Witnesses:
 Hugo Tell,
 C. E. Warner.